UNITED STATES PATENT OFFICE.

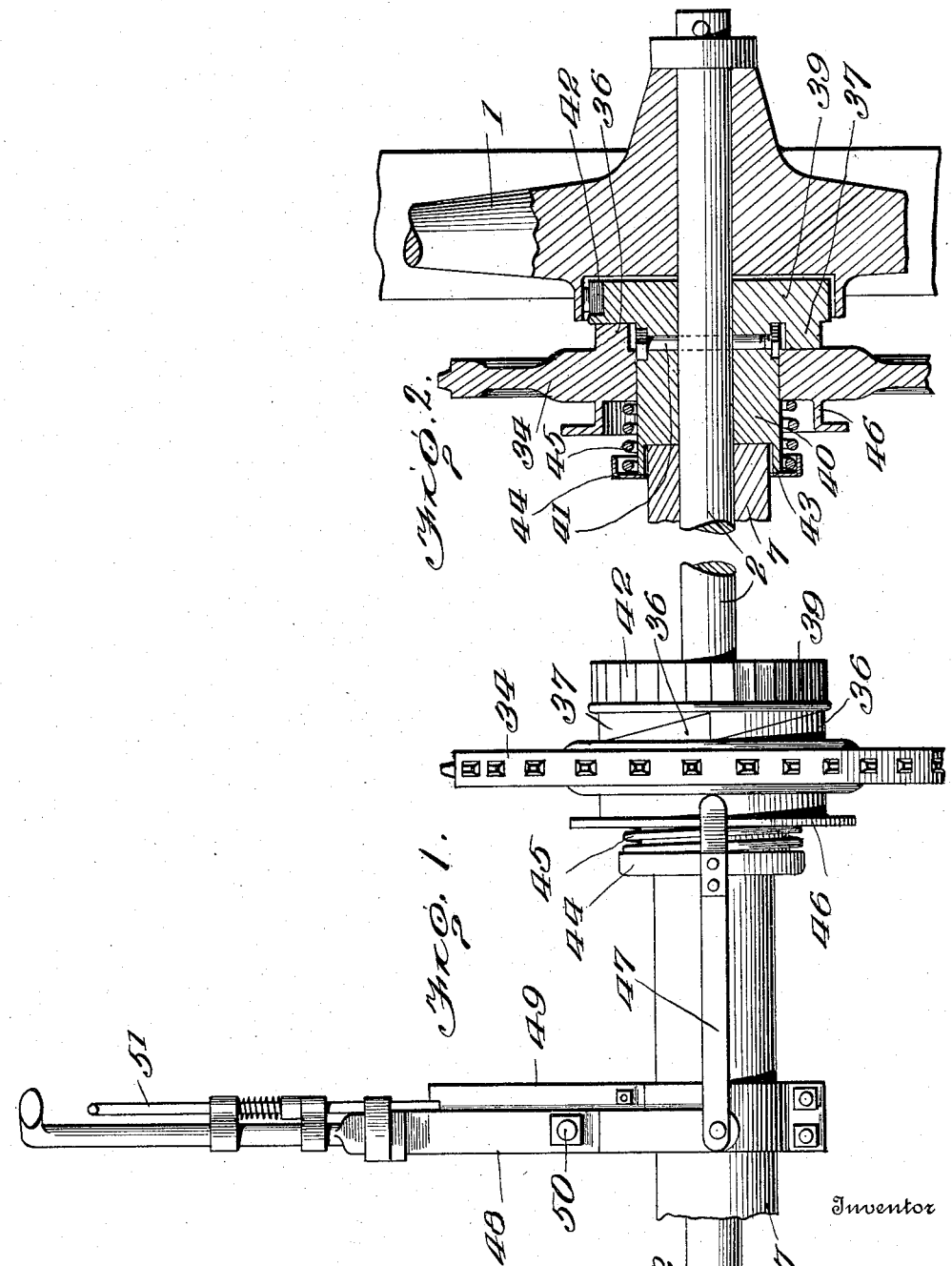

DANIEL ROGER ARNER, OF BERWICK, PENNSYLVANIA.

CLUTCH.

1,174,111.  Specification of Letters Patent.  Patented Mar. 7, 1916.

Application filed August 12, 1914. Serial No. 856,442.

*To all whom it may concern:*

Be it known that I, DANIEL ROGER ARNER, citizen of the United States, residing at Berwick, in the county of Columbia and State of Pennsylvania, have invented certain new and useful Improvements in Clutches, of which the following is a specification.

This invention relates to clutches for controlling the operation of tedders attached to and operated with a mowing machine.

The invention is illustrated in the accompanying drawings and resides in certain novel features which will be particularly pointed out in the claims following the detailed description.

In the drawings, Figure 1 is an enlarged elevation of the clutch mechanism, and Fig. 2 is a longitudinal section of the same.

In the accompanying drawings, the reference numeral 1 indicates the ground wheel and 2 denotes the axle of a mowing machine which are illustrated in a more or less conventional manner, the ground wheel being loosely mounted upon the axle. A sleeve 7 is fitted around the axle between the ground wheels and the side portions of the frame.

Power is transmitted to the tedder by a chain which is trained around a sprocket wheel 34 which is arranged concentrically about the axle and is mounted loosely thereon. The outer face of the side of the hub of the said sprocket wheel is provided with ratchet teeth 36 and these ratchet teeth are adapted to engage ratchet teeth 37 projecting from the inner face of a disk 39 which has its hub 40 extended through the sprocket wheel and firmly secured to the axle 2 by a bolt 41 inserted diametrically through the same, as shown in Fig. 2. The disk 39 is adapted to be actuated by the ground wheel through the well known escapement device which permits the wheel to rotate backwardly without imparting motion to the axle and which also permits the wheels to rotate at different speeds when turning corners.

In the drawings, I have illustrated the disk 39 as provided in its periphery with ratchet teeth 42 which are adapted to be engaged by a suitable pawl carried by the ground wheel but this arrangement, of course, may be reversed without affecting the operation of the mechanism. The inner end of the hub 40 is recessed, as shown at 43, to fit over the end of the sleeve 7 and is also provided with an annular flange or cap 44 serving as a stop to retain a spring 45 in position, said spring being coiled about the hub and bearing against the said stop or flange and the inner face of the hub of the sprocket wheel 34 so that it tends to hold the ratchet teeth 36 in engagement with the ratchet teeth 37 and, consequently, causes the sprocket wheel to be rotated through said engagement. This construction provides for a continuous rotation of the tedder shaft while the machine is in use and at the same time, should a large obstruction be encountered, the gearing may slip without causing any breakage of any of the parts and without effecting a complete disengagement. The sprocket wheel 34 is provided on its inner face with a grooved collar 46 which is engaged by the ends of links 47 extending inwardly from the said collar and having their inner ends pivoted to the lower ends of a forked lever 48. The links are illustrated as consisting of two members bolted together but this detail of construction is immaterial inasmuch as the links can obviously be integral structures having their ends suitably bent to engage the groove in the collar 46. The lever 48 has its lower end forked, as clearly shown, so as to be pivotally attached to both links 47 and thereby exert a pull upon the collar 46 at both sides of the axle, and consequently, prevent vibration of the collar when the same is being shifted. The said lever is fulcrumed upon a standard 49 by a bolt 50, the said standard being securely clamped about the sleeve 7 and passing up between the branches of the lever. The standard is provided with a suitable notch in its upper end to be engaged by a latch 51 mounted upon the lever so that premature or accidental shifting of the collar 46 and the sprocket wheel 34 will be prevented. If the latch be withdrawn from its engagement with the outer face of the standard 49 and no pressure exerted upon the lever 48 the spring will expand and again throw the clutch member 36 into engagement with the clutch member 37.

It is thought the use and advantages of my improved machine will be readily understood from the foregoing description taken in connection with the accompanying drawings. As the machine is drawn over the ground, motion will be imparted to the sprocket wheel 34 from the ground wheels and the tedder shaft will be thereby actuated so that the tedder forks will successively take up the newly cut grass and throw the same into piles or rows in rear of the machine. When the machine is to be turned at the side of a field or is to be moved from one field to another the lever 48 is swung outwardly so as to disengage the clutch members and the travel of the ground wheels will then fail to actuate the tedder shaft. The stop member 44 partly overhangs the spring 45 and the collar 46 also incloses said spring while the clutch members 36 and 37 effectually cover the space between the sprocket wheel 34 and the disk 39 so that dust and dirt cannot collect upon these members in such quantities as to impede or affect the operation of the machine. The disk 39 with its hub 40 is rigidly secured to the axle and fits in, so as to be inclosed by the hub of the ground wheel and, consequently, provides a very strong construction with a minimum number of parts.

Having thus described the invention, what is claimed as new is:—

1. The combination of an axle, a disk having a hub fitted about said axle and secured rigidly thereto, a driving wheel loose upon the axle, interchanging means between the driving wheel and the disk whereby the movement of the driving wheel may be imparted directly to said disk, a gear wheel loosely mounted upon said hub, means for holding the said gear wheel normally in operative engagement with said disk, and means for withdrawing said gear wheel from its engagement with said disk.

2. The combination of an axle, a driving wheel loosely mounted thereon, a disk having a hub fitted about the axle and secured to the axle, a gear wheel loosely mounted upon the said hub, interengaging means between the ground wheel and the disk whereby the disk will be actuated directly by the driving wheel, interengaging clutch members on the gear wheel and the disk respectively, means for holding said clutch members normally in engagement, and means for disengaging said clutch members.

3. The combination of an axle, a driving wheel loosely mounted thereon, a disk having a hub fitted upon the axle and rigidly secured to the axle, a gear wheel fitted loosely upon the hub, interengaging clutch members on the disk and the gear wheel respectively, interengaging means between the driving wheel and the disk whereby the disk will be rotated directly by the driving wheel, a stop at the inner end of the hub, a spring coiled about the hub between said stop and the gear wheel to hold the clutch members normally in engagement, and means for disengaging said clutch members.

4. The combination of an axle, a driving wheel loosely mounted thereon, a disk having a hub fitted on the axle and secured to the axle, a stop at the inner end of the hub, a gear wheel fitted loosely upon the hub, interengaging clutch members on the gear wheel and disk respectively, means whereby the disk will be rotated by the driving wheel, a spring coiled around the hub between the said stop and the gear wheel, a grooved collar on the gear wheel partly inclosing said spring, and means engaging said grooved collar and acting thereon to disengage the clutch members in opposition to the said spring.

5. The combination of an axle, a sleeve fitted thereon, a driving wheel loosely mounted upon the axle, a disk secured to the axle between the driving wheel and the said sleeve, means whereby the driving wheel will rotate the said disk, a loosely mounted gear wheel concentric with the axle and said disk, interengaging clutch members upon the gear wheel and disk respectively, a spring acting against the said gear wheel to hold said clutch members normally in engagement, a grooved collar on the gear wheel, a standard secured to and rising from said sleeve, a forked lever fitted over and fulcrumed to said standard, links pivoted to said lever and engaging said grooved collar, and a latch carried by the lever and engaging the said standard.

In testimony whereof I affix my signature in presence of two witnesses.

DANIEL ROGER ARNER. [L. S.]

Witnesses:
F. N. RITTER,
HENRY F. TRAUGH.

Copies of this patent may be obtained for five cents each, by addressing the "Commissioner of Patents, Washington, D. C."